Feb. 5, 1924. 1,483,011
W. G. READ
HATCH COVERING FOR NAVIGABLE VESSELS, APPLICABLE TO OTHER
SIMILAR PURPOSES
Filed Aug. 2, 1922 7 Sheets-Sheet 1

Inventor
W. G. Read
by
Att'y

Feb. 5, 1924.
W. G. READ
1,483,011
HATCH COVERING FOR NAVIGABLE VESSELS, APPLICABLE TO OTHER
SIMILAR PURPOSES
Filed Aug. 2, 1922
7 Sheets-Sheet 2
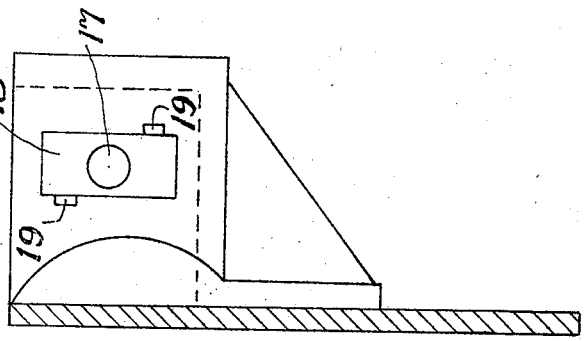
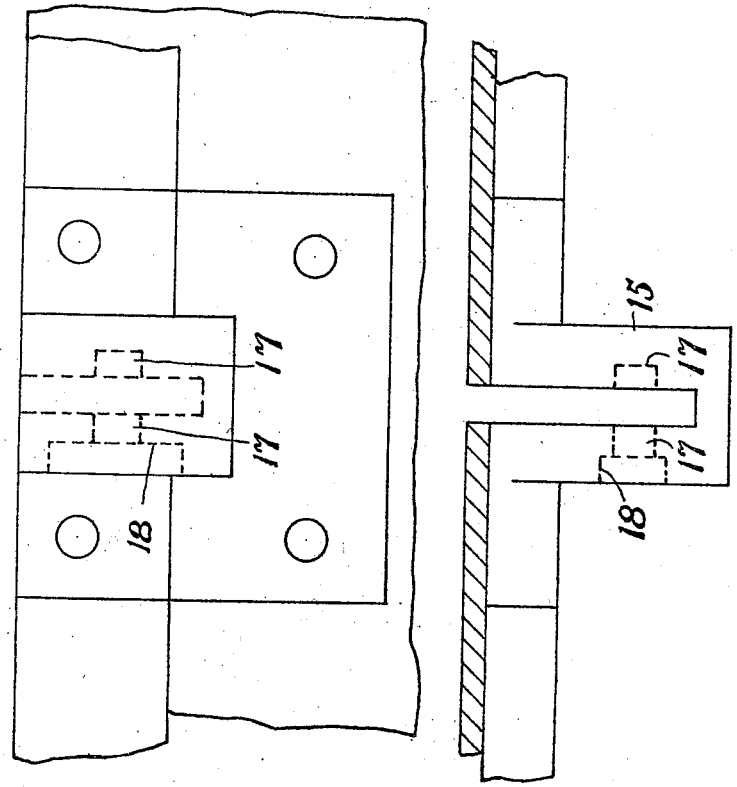
Inventor
W. G. Read
by
Atty

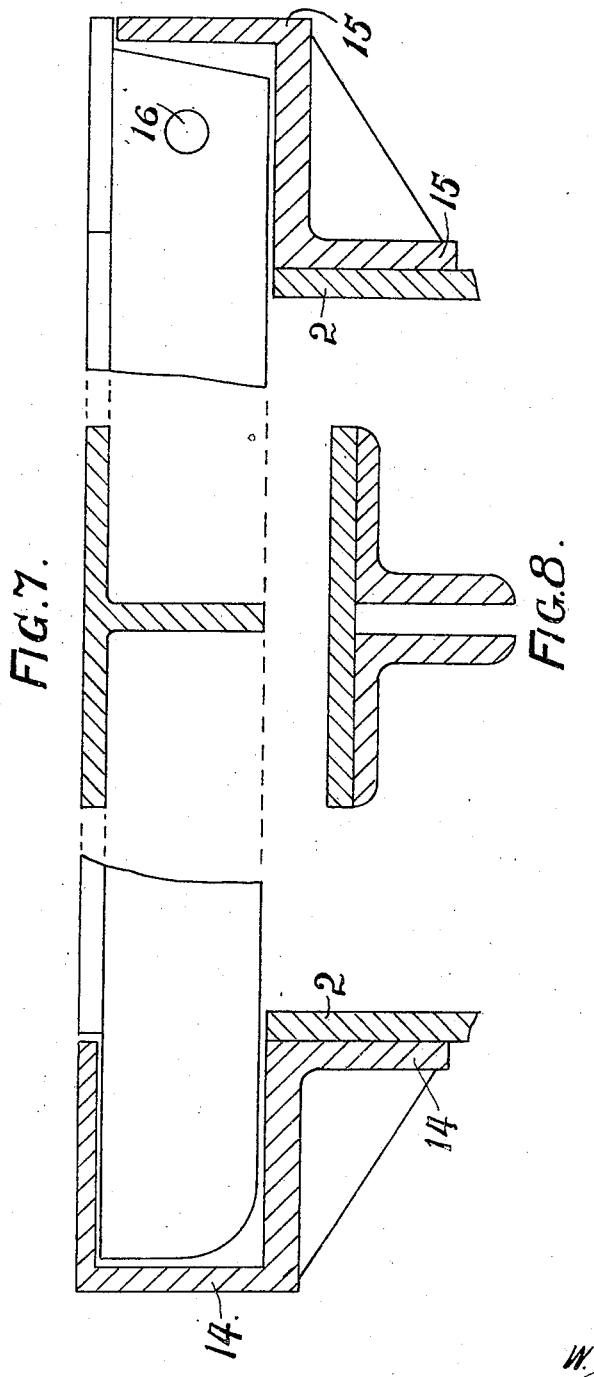

Feb. 5, 1924. 1,483,011
W. G. READ
HATCH COVERING FOR NAVIGABLE VESSELS, APPLICABLE TO OTHER
SIMILAR PURPOSES
Filed Aug. 2, 1922 7 Sheets-Sheet 4
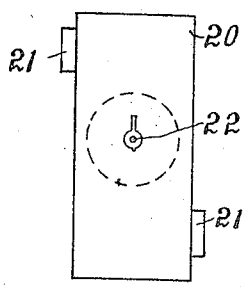
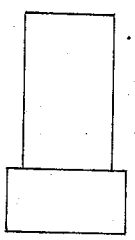
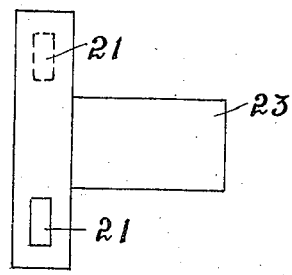
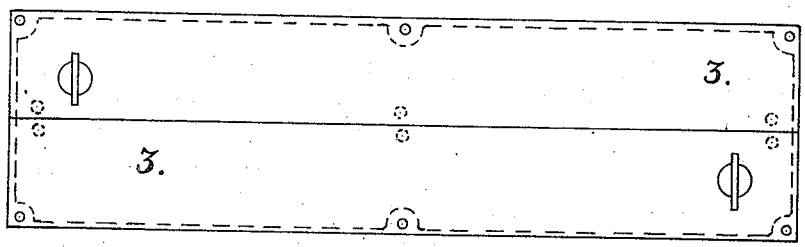
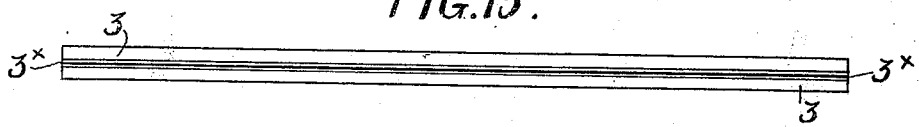
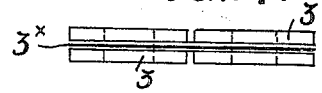
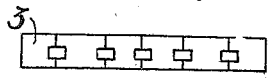
Inventor
W. G. Read
by
Att'y

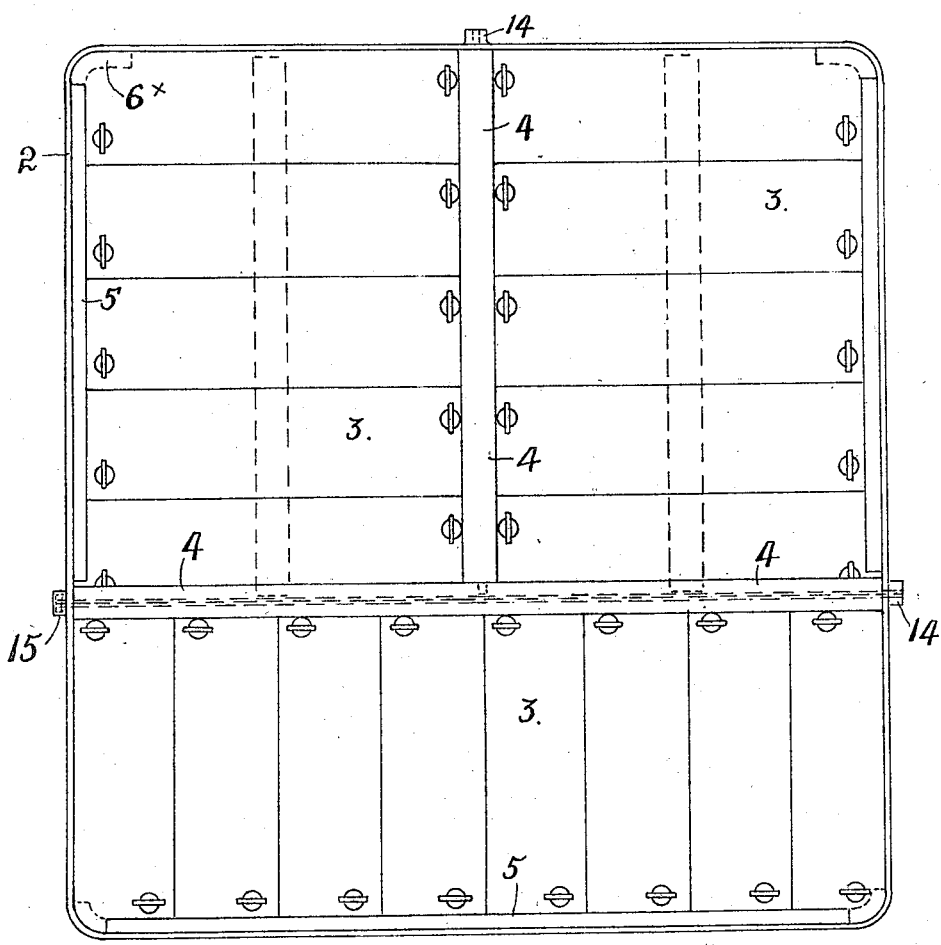

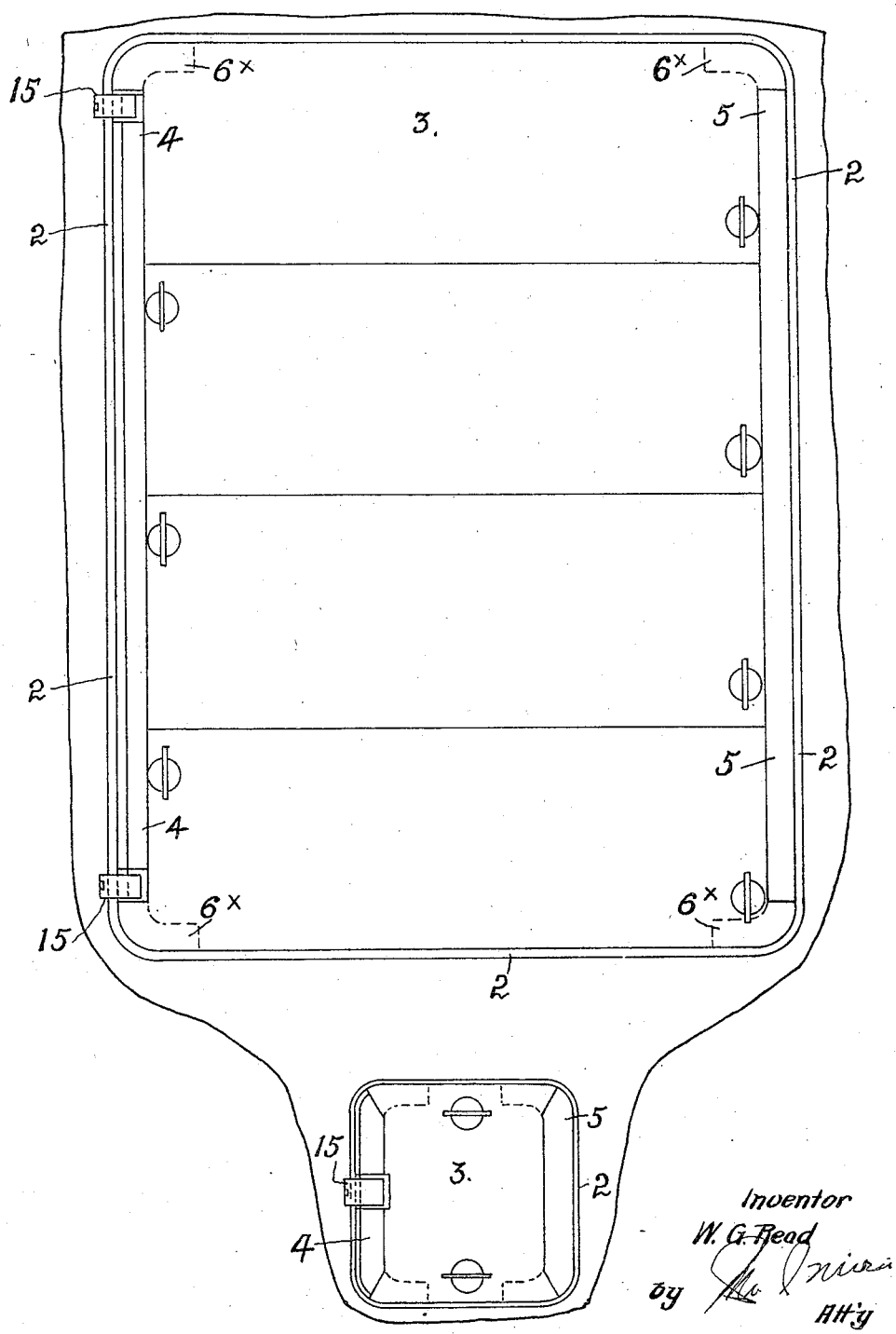

Patented Feb. 5, 1924.

1,483,011

UNITED STATES PATENT OFFICE.

WILLIAM GEORGE READ, OF PRESCOT, ENGLAND.

HATCH COVERING FOR NAVIGABLE VESSELS, APPLICABLE TO OTHER SIMILAR PURPOSES.

Application filed August 2, 1922. Serial No. 579,259.

*To all whom it may concern:*

Be it known that I, WILLIAM GEORGE READ, a subject of the King of England, and residing at Whiston Fields, Prescot, in the county of Lancaster, England, have invented Improvements in and Connected with Hatch Coverings for Navigable Vessels, Applicable to Other Similar Purposes, of which the following is a specification.

This invention has reference to hatch coverings of navigable vessels, applicable also to doors or coverings for closing of openings to rooms or vessels, but for convenience it will be described as applied primarily to the coverings of ship's hold or deck hatches.

Modifications of the application of the invention are given in the accompanying drawings.

In the drawings, Figure 1 is a cross section; Figure 2 is a plan; and Figure 3 is a modification of a locking bar, showing a construction or arrangement, wherein there are two sets of hatch covers to the hatchway.

Figures 4, 5 and 6 are views showing the socket box or device in which one end of the locking bar rests, and in which it is locked.

Figures 7 and 8 are longitudinal section and cross view showing a locking bar, and means of securing its ends on the hatchway.

Figures 9, 10, and 11 are details showing the lock.

Figures 12, 13, and 14, are views showing a modified arrangement of hatch covering.

Fig. 14ª is a transverse sectional view of a slightly modified form of hatch cover.

Figure 17:
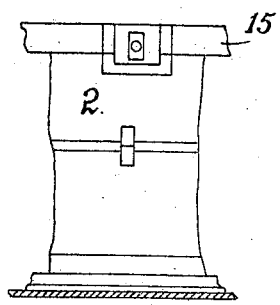
Figure 18:
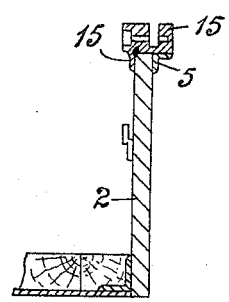

Figures 15 and 16 show another modified arrangement of hatch coverings, and Figures 17 and 18 are details showing lock socket devices of same.

Figure 19:
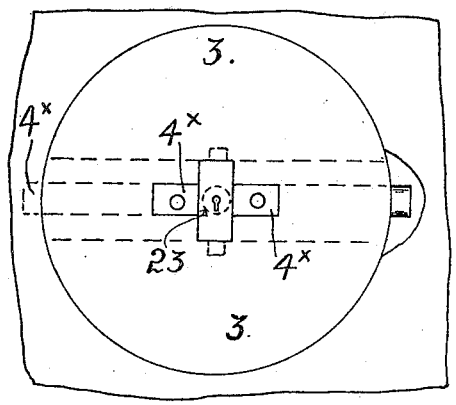
Figure 20:
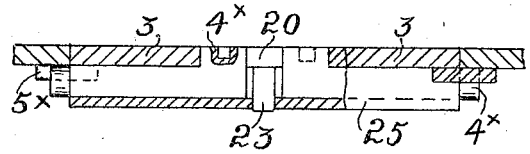

Figure 19 is a plan, and Figure 20 is a section showing a modification under the invention.

In the drawing, 1 is the deck of the ship, 2 are the hatch coamings, 3 are the hatch covers, and 4 the locking bar.

In the arrangements shown one end of the covers 3, when in position, fit within a longitudinal recess on the inside of the coaming formed by two angle bars 5, on one of which the cover rests; the other lying over the end of the covers. In the arrangement shown in Figures 1 and 2, the outer ends of the covers lie in these recesses, and the inner ends of the covers rest on flanges 6 of a girder, the ends of which fit removably in sockets on the inside of the ends of the coaming, and on the sides of cross girder 11 itself, similarly supported in sockets. The girder shown in Figure 1 consists of angle bars fastened on the opposite side of a web 8, which projects up above the angles; and over this part, the channelled web of the locking bar 4 fits and lies; while in Figure 3 the locking bar 4 is simply a T bar.

Between the supports 5 and 6 are intermediate supporting beams 9 resting in sockets 10 as usual on the coaming and on the cross girder 11.

Instead of the ends of the upper part of the girder 8 having a continuous web projecting up above the flanges 6, which comes between the inner ends of the covers 3, where each cover comes, there may be only short lengths or tongues projecting up from the flanges.

Regarding the locking bar and locking means, in the construction shown in detail in Figures 7 and 8, one end fits into the end of, and is secured in, a closed socket box 14, say of cast steel, riveted or fixed on the outside of the coaming 2, the flanges of the bar 4 being cut away at this end, and the web alone entering the box 14; whilst at the other end, the web of the bar 4 drops into the open upper part of the locking socket box 15; part of the flanges of the bar being cut away at this end, as shown, so that the portion left is of the width of the box. The web of the bar 4 at this end is provided with a hole 16, and the lock box sides are provided with holes 17 through which a pin, say of hard steel, formed on the inside of the lock passes, and holds the bar 4 down.

One side of the lock socket 15, is provided with a recess 18, and the lock 20 itself fits within and fills it, so that the outer surface of the lock is flush with the surface of the socket, and it cannot be easily damaged by hitting it, or otherwise, or tampered with. The hole 17 in the side of the socket 15 remote from the recess 18, is blind, as shown, so that the end of the pin 23 of the lock cannot be hit from outside the socket.

The lock is shown in Figures 9, 10, and 11. It has two locking bolts 21, disposed at its opposite ends, or opposite sides; and the socket or recess 18 has corresponding apertures 19 to the bolt 21, in its edges, in which they enter when the lock is locked. The mechanism of the lock may be of an ordinary good type. 22 is the keyhole.

When the lock is placed in position the pin 23 passes through the holes 17 and 16, and the body of the lock enters and practically fills the recess 18. By turning the key, the lock bolts 21 are shot into the bolt holes 19, and so the lock is locked in position in the lock socket, and the bar 4 is also bolted and locked by the bolt pin 23; and the face of the lock lying flush with the face of the lock socket 15, and being protected all round at its edges, and flush with the socket outside, it cannot be easily damaged.

The lock, on its outer plate, is preferably made of relatively thick hard metal, such as case hardened steel, so that it cannot be readily damaged or indented by hammering, chiseling, or otherwise; and similarly, the locking socket boxes are made of hard metal, and well riveted on to the coamings 2, or otherwise securely attached to it.

Referring now to Figures 12 to 14, these figures show a construction of hatch cover made of double boards with strips of steel between them, and between the steel strips there may be introduced lamina of thin wood, or other suitable material. All the laminæ are riveted, bolted, or screwed together.

A modification of the construction of hatch covers 3 shown in Figures 12 to 14, is illustrated in Figure 14$^a$ in cross section, namely, the cover in this case is made of a plurality of bars of wood running in the direction of length of the cover, having in their meeting faces grooves, in which are fitted strips 26 of hard steel or alloy which cannot be cut by a saw or the like. Thus to make a hole in the hatch cover made as described, sufficient to admit a man, it will be necessary to cut through several of the bars 26, which would be difficult.

By these constructions, in the event of an attempt being made to cut through the covers by a saw or like tool, it would be rendered very difficult.

In the arrangement shown in Figure 15, there are two sets of hatch covers, one set consisting of pairs of covers oppositely disposed, with their inner ends supported and secured by a central locking bar 4; whilst the other end consists of a single cover, the inner ends of such cover being held and secured by a locking bar 4 extending between the two sides of the hatch coamings, and at right angles to the other bar 4; and the former bar is secured or held in a plain lock socket 14, at one end on the coaming, whilst the other end is held and locked under the flange of the transverse bar 4. The transverse bar 4 at one end, is secured in a plain socket box 14, whilst the other end is secured in an open lock box 15, in which it is fitted and locked as described with reference to Figures 4 to 7.

Figure 1:
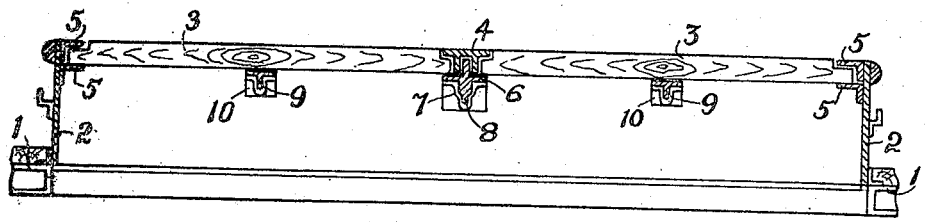
Figure 2:
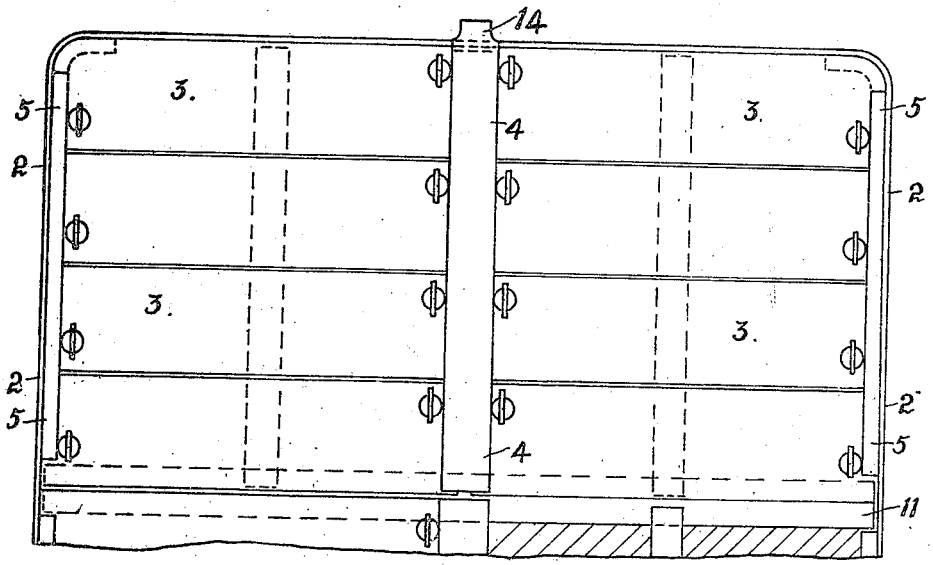
Figure 3:
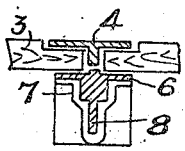

The outer ends of the covers are secured in socket bars 5 similarly as set forth with reference to Figures 1 and 2.

The arrangement shown in Figure 16 shows two modified applications of the invention; namely, a small cargo hatchway and a small man hatchway.

In this case the covers of the cargo hatch are secured by socket bars 5 at one end, whilst their other ends are secured by an angle locking bar 4, fitting over the same, and resting below on a lower angle bar 6$^x$, secured to the inside of the coaming 2; and a locking socket box 15, of the form shown in Figures 17 and 18 is provided at each end, into the open gap in which the vertical web of the locking bar 4 fits; and the lock and its locking pin are entered into the socket and passed through the bar 4 similarly as above described.

The lock sockets 15, in this case, will fit and lie in a gap at each end of the coaming, so that their tops lie flush with the coaming; and they are secured on to the outside of the coaming, similarly as above described, and also to the inner bar 5.

With regard to the man-hatch, placed near the cargo hatch shown in Figure 16, this is arranged in the same way as that of the cargo hatch, with the exception that the locking bar 4 has only a single locking socket 15 on the centre of one side of the hatch.

A modified form of man-hatch is shown in plan in Figure 19, and in section in Figure 20, the hatch covering or closure on this case being flush with the surface in which the opening is provided which for convenience may be assumed to be a ship's metal deck.

In this case, the lock 20 fits in a recess in the cover 3 itself, and the locking bars 4$^x$ are in the form of sliding bolts supported in guides 25, formed on or secured to the underside of the cover or door 3; and in the case shown, the inner ends of the bars 4$^x$ project up at right angles, and lie flush with the cover or door; and when the lock is placed in position in the recess formed in the cover, its body lies between the two bars 4$^x$ and 8, which are moved outwards so that their outer ends lie under the decking or plate in which the cover is fitted. The lock being of the form above described, when locked by its key, will hold the holding or locking bars 4$^x$ outwards in the locked position. The lock surface is flat—or slightly curved from its edges—and at its edges is flush with the top of the cover or door 3; and its outer plate being hard steel or metal is not easily cut or damaged; and filling neatly the recess in which it fits, it cannot be tampered with except with great difficulty.

With regard to the pin 23 of the lock, the locking end passes through a hole in the bar guide 25 so that any dirt that may get into the lock recess can pass through this hole in the guide 25.

The lock recess in the cover 3, on each side of the heads of the bars 4ˣ, will be just sufficient depth to receive the lock, and support it.

In some cases, such as in this case, while the use of the pin 23 is serviceable and prevents the lock being pried up from one end, it is not necessary in this case for actual locking effect on the locking bars 4ˣ; and in any event when the pin 23 is used as in cases above described, it may either form part of the lock or be separate from, but attached to it.

5ˣ is the ring on the underside of the plating in which the cover is fitted, which serves as a rest or support for the cover or door 3.

The invention, as will be seen from the above description is applicable to all sizes of hatches, from a man-hatch to large cargo hatch.

What is claimed is:—

1. In combination, a hatch cover, a locking means therefor, comprising a locking bar having an extension to overlie the hatch cover, means for removably holding one end of said bar, a socket to receive the other end of said bar, and a locking member seating flush in a recess in said socket and having a projection to pass through openings formed in said bar and the walls of said socket.

2. In combination, a hatch cover, a locking means therefor, comprising a locking bar having an extension to overlie the hatch cover, means for removably holding one end of said bar, a socket to receive the other end of said bar, a locking member seating flush in a recess in said socket and having a projection to pass through openings formed in said bar and the walls of said socket, and means whereby said locking member may be locked in said bar recess.

3. The combination with a hatch cover, of a locking bar therefor of T form adapted to overlie the hatch cover, a fixed socket to receive the web portion of said bar at one end, a socket piece open at the top to receive the web portion of said bar at the opposite end, a pin adapted to pass through openings in the walls of said socket piece and in the web portion of said bar, and a lock carried by said pin and adapted to seat in a recess formed in said socket.

4. The combination with a hatch cover, of a locking bar therefor of T form adapted to overlie the hatch cover, a fixed socket to receive the web portion of said bar at one end, a socket piece open at the top to receive the web portion of said bar at the opposite end, a pin adapted to pass through openings in the walls of said socket piece and in the web portion of said bar, and a lock carried by said pin and adapted to seat in a recess formed in said socket, said lock comprising key operated bolt members adapted to engage in the walls of said bar recess to hold the lock and pin removably in place.

In testimony whereof I have signed my name to this specification in the presence of two subscribing witnesses.

WILLIAM GEORGE READ.

Witnesses:
A. M. HANNAY,
BARBARA JAQUES.